United States Patent
Schorr et al.

[15] 3,676,446
[45] July 11, 1972

[54] PHENYLENE-BIS-DITHIOCARBAMIC ACID ESTERS

[72] Inventors: Manfred Schorr, Frankfurt/Main; Walter Durckheimer, Hattersheim/Main; Lothar Behrendt, Konigstein/Taunus; Dieter Duwel, Hofheim/Taunus, all of Germany

[73] Assignee: Farbwerke Hoechst Aktiengesellschaft vormals Meister Lucius & Bruning, Frankfurt/am Main-Hoechst, Germany

[22] Filed: Sept. 8, 1970

[21] Appl. No.: 70,485

[30] Foreign Application Priority Data

Sept. 20, 1969 Germany................P 19 47 746.4

[52] U.S. Cl. .................260/294.8 E, 260/287 R, 424/258, 424/266
[51] Int. Cl. .................................................C07d 31/50
[58] Field of Search.............................260/294.8 E

[56] References Cited

UNITED STATES PATENTS 3,579,525  5/1971  Tilles et al. .................260/294.8 E

*Primary Examiner*—Alan L. Rotman
*Attorney*—Curtis, Morris and Safford

[57] ABSTRACT

Anthelmintically active phenylene-bis-dithiocarbamic acid esters of the formula

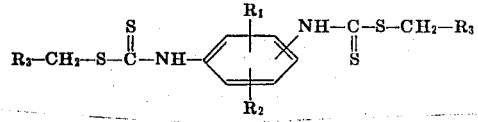

in which $R_1$ and $R_2$ are equal or different and represent hydrogen, halogen, alkyl or alkoxy having from one to six carbon atoms and $R_3$ is pyridyl, quinolyl or isoquinolyl which may be substituted by one or more alkyl radicals having from one to six carbon atoms. A process for their preparation.

7 Claims, No Drawings

PHENYLENE-BIS-DITHIOCARBAMIC ACID ESTERS

The present invention relates to bis-dithiocarbamic acid esters of the general formula I

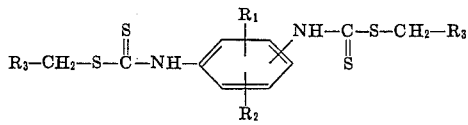

I in which $R_1$ and $R_2$ are equal or different and represent hydrogen, halogen, alkyl or alkoxy having from one to six carbon atoms and $R_3$ is pyridyl, quinolyl or isoquinolyl which may be substituted by one or more alkyl radicals having from one to six carbon atoms.

The present invention further relates to a process for the preparation of the said compounds which comprises reacting a water-soluble salt of a bis-dithiocarbamic acid of the Formula II

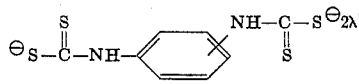

II in which $X^\ominus$ represents one cation-equivalent, with a reactive ester of an alcohol of the Formula III $$R_3-CH_2-OH \qquad III.$$

By the term "relative esters" there are understood especially chlorides, bromides and iodides, further, for example, sulfonates, methylsulfonates (mesylates) and toluenesulfonates (tosylates). The following substances may thus be used as starting materials: 2-chloromethylpyridine, 2-bromomethylpyridine, 2-iodomethylpyridine, 3-chloromethylpyridine, 3-bromomethylpyridine, 4-chloromethylpyridine, 2-chloromethyl-4-methylpyridine, 2-chloromethyl-6-methylpyridine, 2-chloromethyl-4, 6-dimethylpyridine, 2-chloromethyl-4, 5-dimethylpyridine, 6-ethyl-2-chloromethylpyridine, 2-tosyloxymethylpyridine, 3-mesyloxymethylpyridine, 2-hydroxysulfonyloxypyridine, 2-chloromethylquinoline, 2-bromomethylquinoline, 3-chloromethylquinoline, 4-chloromethylquinoline, 1-chloromethylisoquinoline, 3-chloromethylisoquinoline, 4-chloromethylisoquinoline, 1-chloromethyl-4-methylisoquinoline. These compounds are advantageously used as hydrochlorides and, at the beginning of the reaction, set free by addition of the equivalent amount of base.

The salts of the phenylene-bis-dithiocarbamic acid esters of the formula II can be obtained by the method described by van der Kerk et al. (Rec. 74, 1268 (1955)). Advantageously, the alkaline, alkaline earth or ammonium salts as well as the salts of organic bases, especially tertiary amines, are used.

The reaction is advantageously carried out as follows: a compound of the formula III dissolved in a water-miscible solvent, for example acetone, alcohol, tetrahydrofurane, dioxane, acetonitrile, formamide, dimethylformamide, or dimethylsulfoxyde, is added to the aqueous solution of a phenylene-bis-dithiocarbamate. The reaction product, which precipitates after a short time, is separated and purified by washing or reprecipitating from suitable solvents. According to another operation mode, it is also possible to prepare in situ the phenylene-bis-dithiocarbamate from the corresponding phenylenediamine, carbon disulfide and alkali or ammonia and then to react it immediately with a halogen derivative of a compound of the formula III. The reaction temperature should be between about 0° and 60° C, room temperature being preferred.

The phenylene-bis-dithicarbamic acid esters of the present invention are chemotherapeutically active and suitable for fighting helminthic diseases in mammals. They are especially active against several species of cat liver fluke (*Opisthorchis felineus, Opisthorchis viverini, Clonorchis sinensis*), and against which up to now no specific chemotherapeutic agent exists. Liver fluke diseases are an important problem in many countries of Asia.

The chemotheraperitic tests were carried out using gold hamsters which had been infected with *Opisthorchis felineus*. The examined compounds were applied orally to the animals for 3 to 5 consecutive days (once each day). The success of the treatment was judged by examination of the excrements for egg-secretion as well as by dissection.

The following Table I lists the therapeutic results obtained with a number of compounds prepared:

Table I

| Preparation | Maximum tolerable dose (mg/kg mouse), orally | Curative dose (mg/kg gold hamster), orally |
| --- | --- | --- |
| Example 1a | >6000 | 3 ± 50 |
| Example 1c | 3200 | 3 × 50 |
| Example 1d | 3200 | 3 × 50 |
| Example 1e | >3000 | 3 × 50 |
| Example 1f | 800 | 3 × 50 |
| Example 2a | >1500 | 3 × 50 |

The invention compounds are advantageously used for the production of orally applicable preparations for the treatment of helmintic diseases.

Suitable medical preparations are for example capsules, dragees, tablets etc., which may contain, in addition to the invention compounds, the usual auxiliaries and carriers. It is also possible to combine the products of the invention with other chemotherapeutic agents. The dose of the active substance to be used depends on the compound incorporated as active ingredient and on the desired effect.

The following examples illustrate the invention.

EXAMPLE I a. 1,4-Phenylene-bis-dithicarbamic acid pyridyl-2-methyl ester.

A solution of 32.8 g of 2-chloromethylpyridine-hydrochloride and 20 g of sodium bicarbonate in 200 cc. of acetone/water 1:1 was added, at room temperature, while stirring, to a solution of 29.5 g (0.1 mol) of ammonium salt of 1,4-phenylene-bis-dithiocarbamic acid in 1.5 l of water. The reaction product precipitated rapidly and was suction-filtered after about 30 minutes, thoroughly washed with water and acetone and dried in vacuo over sulfuric acid. 29.6 g (67 percent) of 1,4-phenylene-bis-dithiocarbamic acid pyridyl-2-methyl ester having a decomposition point beginning at 160° C were obtained.

| Quantitative Analysis: | $C_{20}H_{18}N_4S_4$ | | | (m.w. 442.7) |
| --- | --- | --- | --- | --- |
| Calculated: | C 54.26 | H 4.10 | N 12.66 | S 28.97 |
| Found: | C 54.3 | H 4.1 | N 12.9 | S 27.5 |

In an analogous manner there were obtained:

b. 2-Methyl-1,4-phenylene-bis-dithiocarbamic acid pyridyl-2-methyl ester, decomposition beginning at 127°C.

c. 2-Methoxy-1,4-phenylene-bis-dithiocarbamic acid pyridyl-2-methyl ester, decomposition beginning at 135°C.

d. 2,5-Dimethyl-1,4-phenylene-bis-dithiocarbamic acid pyridyl-3-methyl ester, decomposition beginning at 165°C.

e. 1,4-Phenylene-bis-dithiocarbamic acid pyridyl-3-methyl ester, decomposition point: 179°–181°C.

f. 2-Methyl-1,4-phenylene-bis-dithiocarbamic acid pyridyl-3-methyl ester, decomposition point: 167°–170°C.

g. 1,4-Phenylene-bis-dithiocarbamic acid pyridyl-4-methyl ester, decomposition beginning at 179°C.

h. 2-Methyl-1,4-phenylene-bis-dithiocarbamic acid-(5-methylpyridyl-2-)-methyl ester, decomposition point: 131°–135°C.

i. 2,5-Dimethyl-1,4-phenylene-bis-dithiocarbamic acid pyridyl-2-methyl ester, decomposition point: 150°–152° C.

EXAMPLE 2 a. 1,3-Phenylene-bis-dithiocarbamic acid pyridyl-2-methyl ester.

21.6 g (0.2 mol) of 1.3-phenylene-diamine were suspended in a mixture of 93 cc. of concentrated ammonia and 26 cc. of water, and 27 cc. of carbon disulfide were added, while stirring, at 30° C. After 2 ½ hours of stirring at room temperature, the precipitated ammonium salt of 1,3-phenylene-bis-dithiocarbamic acid was suction-filtered, washed with a little amount of water and acetone and dried at the air. The yield was 44 g (75 percent).

29.4 g (0.1) mol of the ammonium salt of 1,3-phenylene-bis-dithiocarbamic acid were dissolved in 500 cc. of water, and a solution of 32.8 g of 2-chloromethyl-pyridine-hydrochloride and 20 g of sodium bicarbonate in 200 cc. of acetone/water 1:1 was added, while stirring, at room temperature. The reaction product precipitated rapidly and, after 1 hour of stirring and cooling, the product was suction-filtered, thoroughly washed with water and acetone and dried in vacuo. 26.5 g (60 percent) of 1,3-phenylene-bis-dithiocarbamic acid pyridyl- 2-methyl ester were obtained; decomposition point: 133°–136° C.

| Quantitative Analysis: | C₂₀H₁₈N₄S₄ | | | (m.w. 442.7) |
|---|---|---|---|---|
| Calculated: | C 54.26 | H 4.10 | N 12.66 | S 28.97 |
| Found: | C 54.3 | H 4.2 | N 13.3 | S 27.9 |

In an analogous manner there were obtained:
b. 1,3-Phenylene-bis-dithiocarbamic acid-(6-methyl-pyridyl)-2-) methyl ester, decomposition point: 132°–134° C.
c. 5Methoxy-1,3-phenylene-bis-dithiocarbamic acid pyridyl-2-methyl ester, decomposition point: 138°–144° °C.
d. 1,3-Phenylene-bis-dithiocarbamic acid pyridyl-3-methyl ester, decomposition beginning at 150° C.

EXAMPLE 3 a. 1,3-Phenylene-bis-dithiocarbamic acid quinolyl-2-methyl ester.

7.35 g (0.025 mol) of the ammonium salt of 1,3-phenylene-bis-dithiocarbamic acid were dissolved in 200 cc. of water, and a solution of 5 g of sodium bicarbonate and 10.7 g of 2-chloromethylquinoline-hydrochloride in 100 ml of methanol was added while stirring at room temperature. The precipitate formed after some time was suction-filtered, washed with acetone and ether and dried in vacuo. 5 g (37 percent) of 1,3-phenylene-bis-dithiocarbamic acid quinolyl-2-methyl ester, decomposition point 128°–129° C, were obtained.

| Quantitative analysis: | C₂₈H₂₂N₄S₄ | | | (m.w. 542.8) |
|---|---|---|---|---|
| Calculated: | C 61.97 | H 4.09 | N 10.32 | S 23.64 |
| Found: | C 61.9 | H 4.1 | N 10.6 | S 23.4 |

In an analogous manner there was obtained:
b. 2-Methyl-1,4-phenylene-bis-dithiocarbamic acid quinolyl-2-methyl ester, decomposition beginning at 133° C.

What is claimed is:

1. Bis-dithiocarbamic acid esters of the Formula I

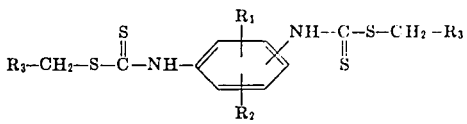

in which $R_1$ and $R_2$ are equal or different and represent hydrogen, halogen, alkyl or alkoxy having from one to six carbon atoms, and $R_3$ is pyridyl, which may be substituted by one or more alkyl radicals having from one to six carbon atoms.

2. 1,4-Phenylene-bis-dithiocarbamic acid pyridyl-2-methyl ester.
3. 2-Methoxy-1,4-phenylene-bis-dithiocarbamic acid pyridyl-2-methyl ester.
4. 2,5Dimethyl-1,4-phenylene-bis-dithiocarbamic acid pyridyl-3-methyl ester.
5. 1,4-Phenylene-bis-dithiocarbamic acid pyridyl-3-methyl ester.
6. 2-Methyl-1,4-phenylene-bis-dithiocarbamic acid pyridyl-3- methyl ester.
7. 1,3-Phenylene-bis-dithiocarbamic acid pyridyl-2-methyl ester.

* * * * *